Figure 1:
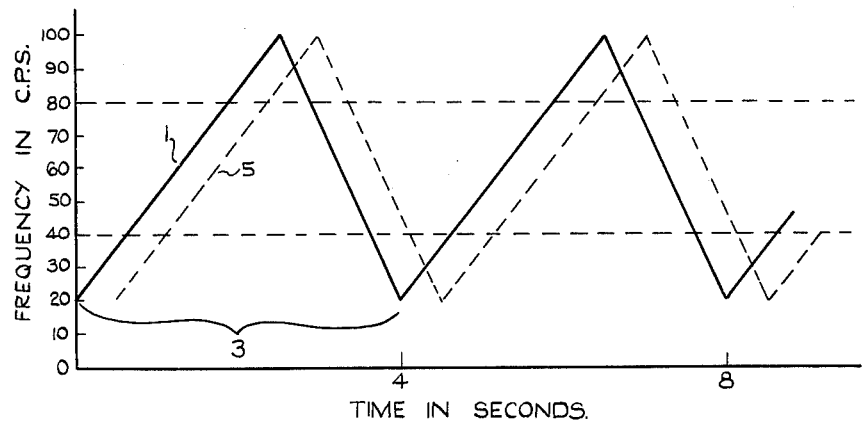

Jan. 18, 1966   J. K. LYONS ETAL   3,229,784
PROGRAMMING SYSTEM FOR A CONTINUOUS WAVE GENERATOR
Filed Nov. 1, 1960   2 Sheets-Sheet 1

ATTEST.
Charles F. Steininger

INVENTOR.
James K. Lyons.
Tom Prickett Jr.
John P. Woods.
BY
ATTORNEY.

United States Patent Office 3,229,784
Patented Jan. 18, 1966

3,229,784
PROGRAMMING SYSTEM FOR A CONTINUOUS
WAVE GENERATOR
James K. Lyons, Dallas, Tom Prickett, Jr., Richardson, and John P. Woods, Dallas, Tex., assignors to The Atlantic Refining Company, Philadelphia, Pa., a corporation of Pennsylvania
Filed Nov. 1, 1960, Ser. No. 66,548
9 Claims. (Cl. 181—.5)

This application is a continuation-in-part of copending application, Serial No. 453,853, now United States Patent 2,982,371 entitled, "Seismic Exploration Method and Apparatus." Hereinafter, application 453,853 will be referred to as the basic method application.

This invention relates to a method and means for generating a cyclically-varying continuous wave signal. More particularly, the invention relates to a hydraulic means for generating a predetermined cyclically-varying continuous wave signal of a predetermined period. Most specifically, the invention relates to a hydraulic programming system for a continuous wave generator use in seismic exploration operations.

Heretofore, various types of eccentric weights have been rotated to create a steady state signal in lieu of transient signals created by dynamite exposions for use in seismic survey operations. For various reasons, as explained in detail in the basic method application, no prior method or apparatus has been devised to satisfactorily separate the reflected continuous wave seismic signals from the received surface noise and refracted signals.

United States Patent 2,921,477, issued to Hanggi, discloses a continuous wave generator used in practicing a known method of continuous wave operation. This patent discloses two rotating eccentric weights, each weight being hydraulically-controlled to adjust its radius of gyration so that as the frequency varies, the force applied to the ground remains constant. The speed of rotation of the Hanggi device is controlled by the speed of a driving motor. Although the Hanggi device is designed to apply equal force to the ground as the frequency changes, no means are provided for ensuring that the signal created is nonrepetitive for a time longer than the greatest delay to be measured in the exploration process. This type of nonrepetitive signal is needed both in the prior art and in the basic method application. Applicants' novel device not only ensures a continuous wave nonrepetitive signal of the desired period, it automatically provides for the desired variations during the nonrepetitive period and for periodic repetition, if desired.

The novel basic method is not dependent upon applying equal force to the earth as the frequency varies. It has been determined that this operation is not necessary, and even if equal force is applied to the surface, the earth's attenuation characteristics vary the frequency components of received signals so greatly than an equal force system cannot be relied upon. That is, the attenuation characteristics of the earth vary reflected signals on the order of from one to upward of a million times. In view of the attenuating effects, the basic method has relied upon the change of frequency to interpret the received signal. That is, a cyclically-varying signal, shown as 1 in FIGURE 1, of a period 3 greater than the two-way travel time to the deepest bed of interest is applied to the earth's surface. This signal 1, received at a remote geophone, is compared to the transmitted signal 5 which is variably delayed over a period of time. When the delayed signal 5 and the received signal 1 are in phase, an output wavelet is passed and recorded, indicating the travel time to a particular depth or bed of interest. When the delayed and received signals are out-of-phase, no signal is passed.

Since the subject basic method of operation is dependent upon a cyclically-varying signal of a predetermined period or periods of time, it is essential to the operation of the method that a cyclically-varying control system be available to provide automatic repetition of the cyclically-varying signal until the generator is moved to a new location. This control system must be flexible and automatic in nature so that as the terrain of interest varies and the deepest bed of interest changes, the period 3 of the cyclically-varying signal can be appropriately varied as well as the manner in which the frequencies increase and decrease throughout a given period. For shallow beds, higher frequencies and shorter repetition periods can be used for greater resolution. For deeper beds, lower frequencies and longer periods can be used to combat frequency attenuation. Heretofore, no satisfactory method or device has been devised to generate a predetermined cyclically-varying signal of a desired period or periods in continous wave seismic operations.

It is, therefore, the object of this invention to provide an improved cyclically-varying continuous wave generator for use in seismic operations.

A further object of this invention is to provide a flexible continuous-wave generator and control system adapted for operations over varied surface and subsurface formations.

A further object of this invention is provide an improved control system simplified in nature, dependable in operation, and suited for use in all continuous wave seismic operations.

A further object of this invention is to provide a self-contained adjustable programming system for controlling in a predetermined manner the frequency variation of a cyclically-varying signal produced by a continuous wave seismic generator.

A further object of this invention is to provide a programmer for a continuous wave seismic generator in which the rate and length of frequency acceleration and frequency deceleration can be controlled in a predetermined manner.

The general arrangements and other objects of our invention may be more readily determined by the drawings wherein:

FIGURE 1 discloses a plot of frequency versus time of a cyclically-varying signal generated by the invention.

Figure 2:
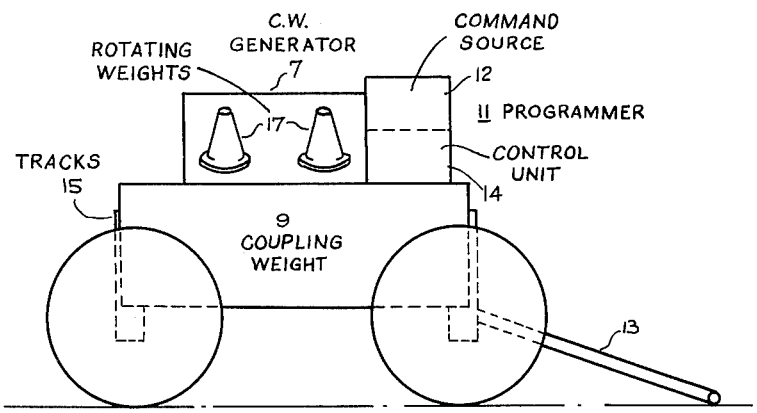

FIGURE 2 discloses a pictorial presentation of one type of continuous wave generator, carriage, and frequency control system.

Figure 3:
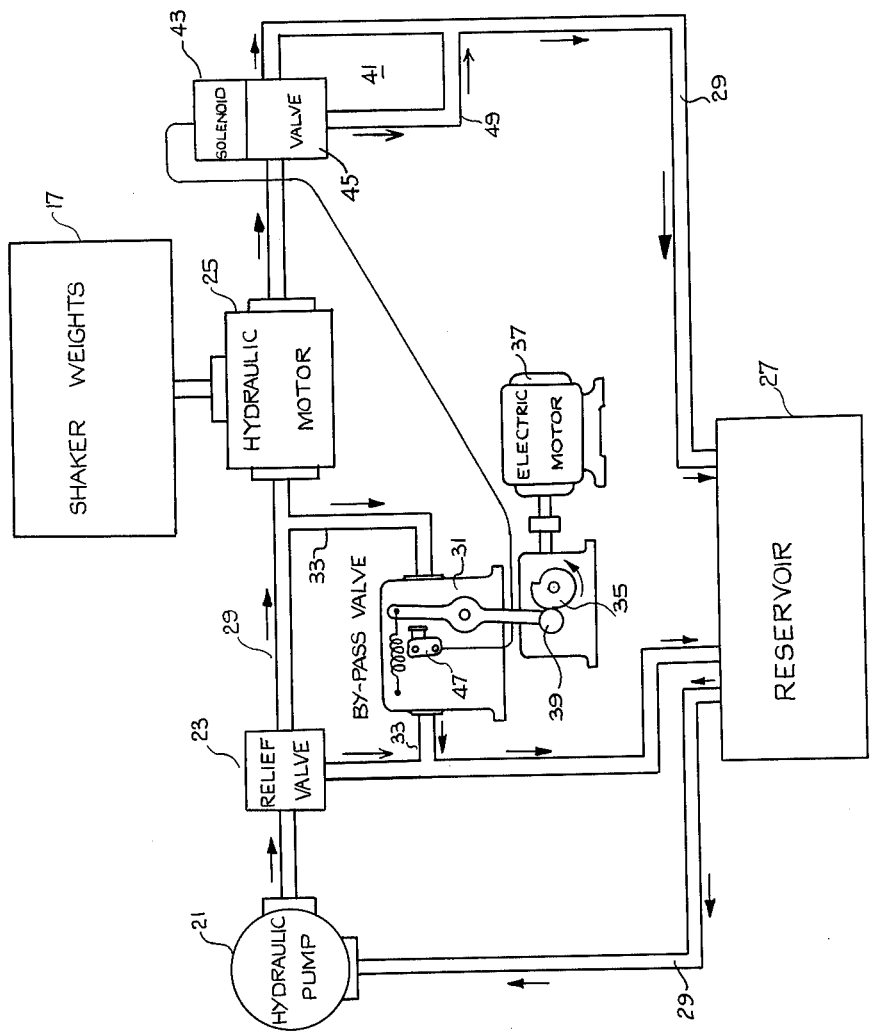

FIGURE 3 shows a schematic of a preferred frequency control system.

The present invention contemplates a novel frequency control programmer for producing preselected rates of frequency increase and decrease over a selected period of time. Generally speaking, the invention includes a hydraulic pump and a hydraulic motor separated by a controlled flow valve. The hydraulic motor is connected to a shaker device and the flow valve is controlled by a programming unit designed to vary the acceleration and deceleration of the hydraulic motor according to a predetermined requirement.

FIGURE 1 discloses an illustrative cyclically-varying signal 1 capable of being produced by the subject invention and utilized by the methods disclosed in the basic method application. Continuous signal 1 is shown in terms of frequency versus time. Assuming that the continous wave generator is programmed to start revolving at, say, 20 cycles per second, the program rate of acceleration causes the generator to increase to the desired maximum frequency, say 100 cycles per second, and then drop back down to 20 cycles per second at the end of a time period equal to or greater than the two-way travel time to the deepest bed of interest. In FIGURE 1, the period time 3 required to execute the frequency excursion of signal 1 is 4 seconds. Of course, it should be understood that maximum and minimum frequencies as well as the period length can be varied as desired. The selected frequency excursion is repeated the desired number of times as shown in FIGURE 1. As detailed in the basic method application, generated cyclically-varying signal 1 is transmitted through the earth and received at a remote seismometer. The transmitted signal is also delayed varying amounts and combined by appropriate means with the received signal at the remote seismometer. When the variably delayed signal 5 arrives in phase with signal 1, a relay filter or other suitable combination produces an output indicating that the two-way travel time to a bed of interest is equal to the variable delay (of signal 5) at the time of the recorded output.

Applicants have invented a simple, reliable, and highly flexible system for automatically providing the desired rate of acceleration (and deceleration, if desired) and period of operation of a cyclically-varying signal. The device also ensures that each cyclically-varying signal is repeated in the same manner, therefore producing an unexpected advantage of facilitating the filtering of crossover noise as disclosed in copending application No. 66,-549, also a continuation-in-part of copending application 453,853.

FIGURE 2 discloses a schematic of one type of continuous wave generator that might be utilized to conduct continuous wave seismic operations as disclosed in the basic method application. Continuous wave generator 7 is shown mounted on coupling weight 9 and connected to frequency control programmer 11 which includes a command source 12 and a control unit 14. Coupling weight 9 is transported on carriage 13. When the continuous wave generator is moved to the area of interest, coupling weight 9 is lowered to the ground on tracks 15 so that the downward vibrations by the continous generator 7 are coupled through the weight to the surface of the earth. Coupling weight 9 must be of sufficient weight to overcome the upward thrust of the four rotating eccentric weights 17 as they reach the apex of their swing. Two weights 17 are not shown since they are located on the opposite side of generator 7.

FIGURE 3 shows a schematic diagram of the preferred hydraulic frequency control system. Hydraulic pump 21 is connected to optional variable relief valve 23, which, in turn, is connected to a hydraulic motor 25. Motor 25 drives the eccentric shaker weights 17. Pump 21 and motor 25 are connected to a hydraulic fluid reservoir 27 by flow lines 29 which also connect other components as illustrated. Flow control unit or by-pass valve 31 is connected between pump 21 and motor 25 by by-pass line 33 in such a manner as to be able to vary the amount of fluid reaching motor 25. Flow valve 31 is controlled by a cam 35 which is rotated by motor 37 and serves as a command source. Cam 35 is replaceable so that the rate of acceleration and period of operation can be varied as desired. Cam follower 39 varies the flow control valve 31 and the amount of fluid reaching motor 25 according to the shape of cam 35. If it is desirable to control the rate of deceleration, the apparatus 41 is utilized. This apparatus contains a solenoid 43 and a solenoid-operated valve 45 positioned between motor 25 and reservoir 27.

The progammer system is set up by ascertaining two-way travel time to the maximum depth of interest. Then a period is selected to be equal to or greater than this two-way travel time. Next, the desired rate of acceleration and deceleration is determined. With this information at hand, a command cam 35 of the proper shape and size to give the desired rate of acceleration over the selected period is obtained and mounted on the shaft of motor 37.

In operation, pump 21 is activated and produces a constant rate of flow through optional relief valve 23 to motor 25 and back to reservoir 27. The flow rate of fluid reaching hydraulic motor 25 determines the speed of rotation at any one time of the weights 17. Electric motor 37 revolves command cam 35, causing cam follower 39 to vary flow control valve 31 and the amount of hydraulic fluid bleed-off through line 33. Assuming that cam 35 is shaped to produce the frequency variation of signal 1 shown in FIGURE 1, valve 31 will be slowly closed so that the fluid flow rate reaching 25 is gradually increased. This increased flow rate increases the rotation of weights 17 until cam 35 reaches the point of maximum frequency, in this case, 100 cycles per second, FIGURE 1. Assuming that the system's natural rate of deceleration is not desirable, the deceleration controller shown as 41 is utilized. After cam 35 reaches its point of maximum program frequency, cam follower 39 is released and allowed to strike microswitch 47. This switch activates solenoid 43 closing valve 45 and causing the fluid to pass through by-pass line 49 back to the reservoir. The flow through 49 can be regulated by a preset needle valve, a preset spring-biased valve, by varying the diameter of the by-pass line, etc. Simultaneously with the activation of the solenoid, valve 31 is reopened, bleeding-off most of the hydraulic fluid from line 29. All of the fluid is not bled off since the inertia developed by the rotation of weights 17 causes motor 25 to continue to rotate and act as a pump. The pumping action forces some fluid through 25, by-pass line 49, and back to reservoir 27. The rate of deceleration of the inertia-propelled motor 25 depends upon the preset rate of flow through by-pass line 49 and its associated valve. After signal 1, FIGURE 1, has dropped to its preselected minimum frequency, cam 35 rotates follower 39 away from switch 47, deactivating solenoid 43, and opening valve 45 so that the fluid flows through line 29 instead of through by-pass line 49. It is preferable to utilize a relief valve between motor 25 and reservoir 27 in addition to the one shown as 23. If a deceleration controller is used, a preset spring-loaded valve can be used with by-pass line 49 to act both as a relief valve and the means to control the rate of flow through 49.

It is obvious from the discussion above that a cyclically-varying signal of any desired period or periods can be programmed to include maximum and minimum frequencies as well as the rate of deceleration and acceleration. The advantages of this system are obvious and can be varied and improved in various ways without departing from the scope of the invention; that is, the type of command source used to control the flow valve may be varied to include any well-known means such as a cam-operated rack, a Saginaw-type drive screw, a servo-operated control, etc. In addition, other types of systems may be utilized for the disclosed hydraulic system. For instance, an electric-type programmer where a magnetic tape, punched tape, punched card, etc., is used as the command means to send preselected commands in the form of frequency, voltage, or current to a suitable electric motor, or the like. The motor acts as the control means carrying out the preselected tape instructions so as to drive shaker weights in a manner to produce the desired rates of acceleration and deceleration and period or periods of operation.

As stated heretofore, the use of a device to control the rate of deceleration is not essential to the scope of the invention. Experience has proven that in most cases the system's natural rate of deceleration is satisfactory. It should also be noted that relief valve 23 is not essential to the operation of the device and is used only as a safety factor to prevent an excessive pressure build-up in the system.

Therefore, it is to be observed that, although specific embodiments of the instant invention have been illustrated and described herein, varous modifications and substitutions may be made, which will be obvious to those skilled in the art, without departing from the scope

We claim:

1. A continuous wave seismic generator and a programmer for automatically governing the rate of the generator's acceleration and the period of cyclically varying signals created thereby comprising,
    (a) a shaker,
    (b) a motor connected to said shaker, and
    (c) a programmer connected to said motor in a manner to vary the acceleration of said motor in a predetermined manner for a period of time longer than the longest travel time of reflected seismic waves.

2. In an apparatus as set forth in claim 1 wherein the programmer includes a control unit for automatically governing the rate of the generator's deceleration.

3. A continuous wave seismic generator and a programmer for automatically governing rate of the generator's acceleration and period of cyclically varying signal created therefrom comprising
    (a) a shaker,
    (b) a hydraulic motor connected to said shaker and
    (c) a programmer connected to said hydraulic motor in a manner to control flow of hydraulic fluid to said motor.

4. In an apparatus as set forth in claim 3 wherein the programmer includes a control unit and drive means for varying said control unit.

5. In an apparatus as set forth in claim 3 wherein the programmer includes a bypass line and a variable bypass valve connected thereto.

6. In an apparatus as set forth in claim 3 wherein the programmer includes a bypass line, a variable bypass valve, and a rotating cam connected to control said bypass valve.

7. In an apparatus as set forth in claim 3 wherein the programmer includes an additional control unit for automatically governing rate of the generator's deceleration, said control unit connected in a manner to control flow of hydraulic fluid from the motor.

8. In an apparatus as set forth in claim 7 wherein the additional control unit includes a solenoid-operated valve and a bypass line.

9. A method of generating a cyclically varying continuous wave of a predetermined period to facilitate elimination of refracted and horizontally traveling waves comprising the steps of continuously rotating eccentric weights, automatically accelerating rotation of said weights in a predetermined manner, after reaching a preselected frequency automatically decelerating said rotation at a predetermined rate, and automatically repeating the steps of acceleration and deceleration.

References Cited by the Examiner

UNITED STATES PATENTS

| | | | |
|---|---|---|---|
| 2,121,411 | 6/1938 | Schroder | 181—0.5 |
| 2,505,221 | 4/1950 | Tomlinson | 181—0.5 |
| 2,521,130 | 9/1950 | Scherbatskoy | 181—0.5 |
| 2,688,124 | 8/1954 | Doty et al. | 181—0.5 |
| 2,745,507 | 5/1956 | Bodine | 181—0.53 |
| 3,106,982 | 10/1963 | Wade | 181—0.53 |

BENJAMIN A. BORCHELT, *Primary Examiner.*

CHARLES W. ROBINSON, CHESTER L. JUSTUS, SAMUEL FEINBERG, *Examiners.*